(12) United States Patent
Jones

(10) Patent No.: US 10,402,228 B2
(45) Date of Patent: Sep. 3, 2019

(54) METHOD AND APPARATUS FOR ASSIGNING PROCESSING WORK IN PARALLEL COMPUTING

(71) Applicant: Joel Kevin Jones, Alameda, CA (US)

(72) Inventor: Joel Kevin Jones, Alameda, CA (US)

( * ) Notice: Subject to any disclaimer, the term of this patent is extended or adjusted under 35 U.S.C. 154(b) by 1 day.

(21) Appl. No.: 15/595,308

(22) Filed: May 15, 2017

(65) Prior Publication Data

US 2018/0329749 A1   Nov. 15, 2018

(51) Int. Cl.
  *G06F 9/50* (2006.01)
  *G06F 9/38* (2018.01)
  *G06F 12/0875* (2016.01)
  *G06F 12/0815* (2016.01)

(52) U.S. Cl.
  CPC .......... *G06F 9/5027* (2013.01); *G06F 9/3834* (2013.01); *G06F 12/0815* (2013.01); *G06F 12/0875* (2013.01); *G06F 9/3842* (2013.01); *G06F 2212/60* (2013.01); *G06F 2212/621* (2013.01)

(58) Field of Classification Search
  CPC .................................................. G06F 9/5027
  See application file for complete search history.

(56) References Cited

U.S. PATENT DOCUMENTS

2016/0065492 A1* 3/2016 Hu .................. H04L 47/783
                                                            709/226

OTHER PUBLICATIONS

Cache Coherence, Lecture notes, 2013, MIT (Year: 2013).*

* cited by examiner

*Primary Examiner* — Charlie Sun

(57) ABSTRACT

Method and apparatus for assigning processing work in parallel computing. A work unit is received in a parallel computing system that has more than one processing core. Each processing core is programmed with a different solution strategy. The work unit is then sent to each processing core, which then each apply their assigned solution strategy to the work unit. As each processing core operates, it maintains its own private state indicator. When one of the processing cores completes its work, then that processor is allowed to update a global system state indicator based on its own private state indicator. Other processing cores are prevented from doing likewise.

10 Claims, 8 Drawing Sheets

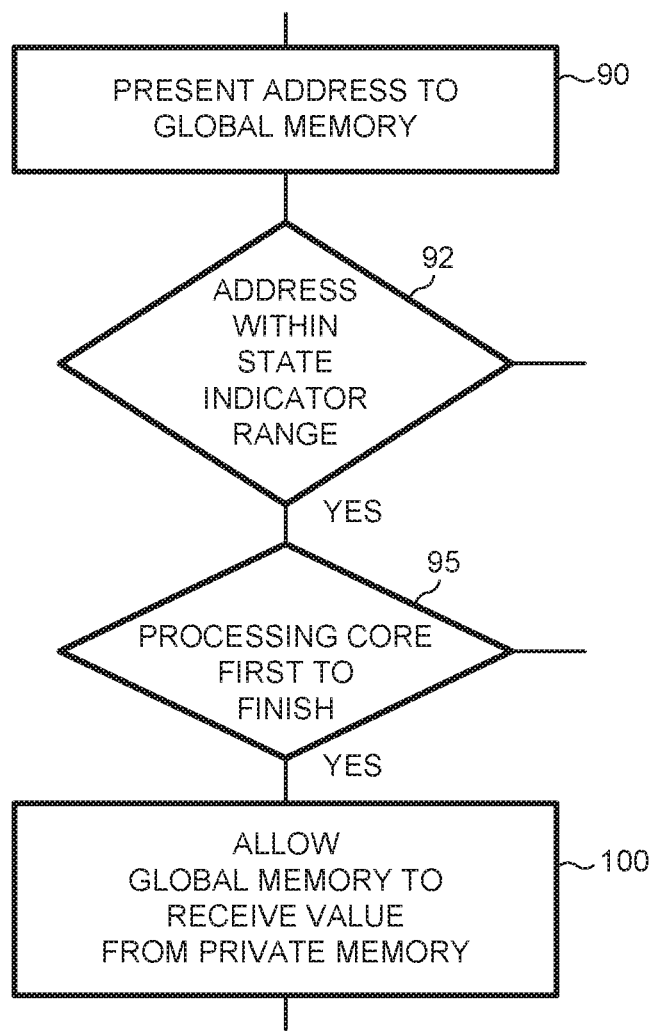

METHOD AND APPARATUS FOR ASSIGNING PROCESSING WORK IN PARALLEL COMPUTING

BACKGROUND

There are many situations in life where we simply don't know which tool to use for a particular job. For example, consider a situation where we need to cut a piece of wood. We may not know everything about the piece of wood that we really need to know in order to select the correct tool to cut that piece of wood. We may also not know if we need to cut the wood along its grain or if we need to cut the wood across the grain. Those that are familiar with woodworking and those that are in the construction industry will immediately know that cutting along the grain requires a ripping blade whereas cutting across the grain requires a crosscut blade.

Once we know the placement of a cut, the grain of the wood may be obscured by a heavy coat of paint. Because the grain of the wood is obscured, we may not realize that we need to cut along the grain until we actually start cutting the wood. It is likely that we initially selected a crosscut blade because that is the most common cutting direction, especially in the construction industry. In this case, we would need to change to a ripping blade so that we can achieve a cleaner cut along the remainder of the cutting job. We also could be faced with an even bigger problem in a situation where the heavy coat of paint actually prevented us from realizing that the material under the paint is actually aluminum. This, of course, requires us to select a metal cutting blade.

This simple wood cutting analogy can be applied in many constructs. For example, in computing systems there are situations where we simply do not know all of the characteristics of an incoming set of information. Typically, we refer to such an incoming set of information as a "work unit". A work unit, in various situations, consists of information that needs to be processed in order to obtain some useful result. Just as with selecting a particular blade for cutting wood, a computer system needs to select a particular solution strategy in order to effectively and correctly process an incoming work unit. This yields a solution unit that is based on the incoming work unit as processed by the properly selected solution strategy.

One example that is easy to understand is that of a computer system that processes data packets. For example, data packets could be in the form of Internet protocol packets. Or, the data packets could represent streaming data such as that used in Internet video broadcasting. There are a myriad of other types of data packets that could conceivably arrive as work units, which the computer system must process. Typically, the computer system will need to use a different solution strategy for various types of data packets in order to obtain a useful result.

Of course, if the computer system typically expects to see Internet protocol packets, the computer system applies a solution strategy by executing a particular computer program. This causes the computer system to examine an Internet protocol packet, process the packet in order to understand any packet specific delivery requirements and then direct the packet to an output. However, if the arriving data packet is not an Internet protocol packet, the computer system will still process the incoming packet as an Internet protocol packet and this would yield an undesirable result.

Once the computer system realizes that it selected the wrong solution strategy, it will attempt to process the incoming data packet according to a different solution strategy. The computer system will try different solution strategies until it finds the right strategy and is able to correctly process an incoming data packet. All of these attempts to properly process an incoming data packet are, up until now, performed in a serial manner. This really limits the number of incoming data packets that can be processed over a particular amount of time.

Modernly, a computer system uses parallel processing cores in order to reduce the amount of time that is spent trying different solution strategies. This type of modern parallel computing system includes a plurality of processing cores, where various processing cores are configured to apply different solution strategies to an incoming work unit. Then, the first processing core that develops an acceptable result is allowed to send its result to a subsequent process. As in the earlier presented example of processing incoming data packets, the first processing core that develops an acceptable result is allowed to send its result to an output, for example by sending a processed data packet to the Internet.

This technique of using parallel processing cores that are configured to apply a different solution strategy to an incoming work unit is often referred to as thread level speculative (TLS) processing. Up until now, thread level speculative processing was managed by a collection of software elements executed by the various processing cores included in a parallel processing system.

BRIEF DESCRIPTION OF THE DRAWINGS

Several alternative embodiments will hereinafter be described in conjunction with the appended drawings and figures, wherein like numerals denote like elements, and in which:

FIG. 7 is a flow diagram that depicts one alternative method for migrating a private state indicator to global memory;

FIG. 8 is a flow diagram that depicts yet another alternative method for migrating a private state variable to a global memory;

DETAILED DESCRIPTION

Figure 1:
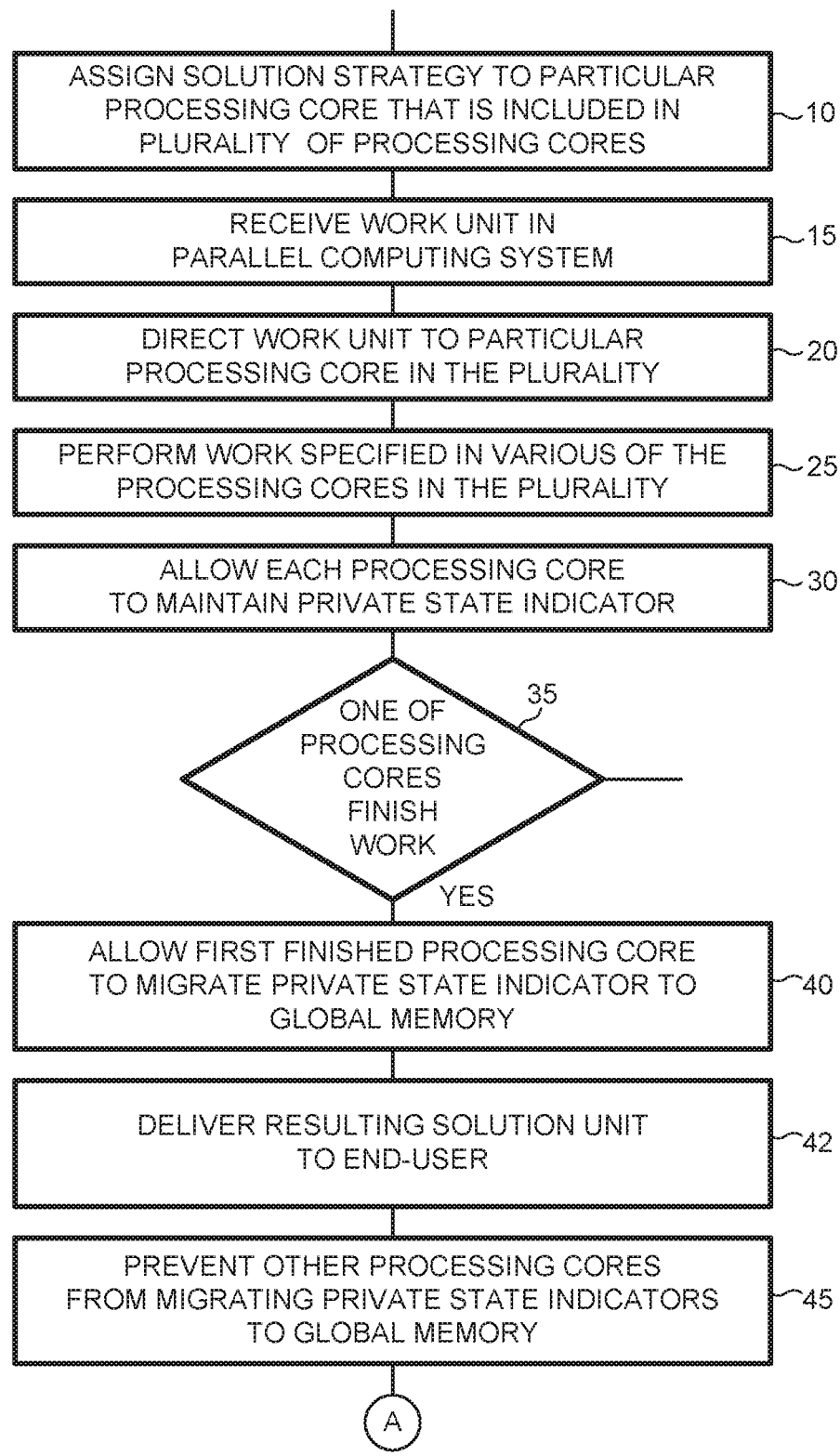
FIG. 1 is a flow diagram that depicts one example method for assigning processing work in a parallel computing system.

It should be appreciated that one of the deficiencies in a software based thread level speculative (TLS) processing system is that all processing cores that are working in parallel to achieve a result based upon an incoming work unit need to manipulate a state variable that is stored in a global memory. This means that a particular processing core in a software-based TLS system must be programmed to use a different portion of the global memory in order to maintain its own system state indicator. This truly does complicate the process of assigning different solution strategies to a particular processing core in the plurality of processing cores provided in the system.

In such prior art systems, it is necessary to maintain different versions of software for each solution strategy. Each of these versions would be configured to use a different region of global memory as it manipulates a system state indicator. Then, a particular version of software for a particular solution strategy is used by a processing core so that it does not conflict with global memory use by another processing core in the system.

Today, a significant amount of the overhead associated with thread level speculative processing is eliminated. According to the methods, techniques and hardware embodiments described herein, thread level speculative processing is accomplished by allowing a particular processing core to behave independently of all others, where other processing cores apply different solution strategies to an incoming work unit.

The clumsy software mechanisms that were needed to manage thread level speculative processing are eliminated through the use of a hardware structure that includes a work management unit. The work management unit monitors various processing cores in order to identify the first processing core that has developed a proper solution based on an incoming work unit. This work management unit then grants permission to this first processing core, enabling the first processing core to store its solution unit either in global memory or to pass the solution unit to an output device, for example an Internet interface. It should be appreciated that any such examples are not intended to limit the scope of the claims appended hereto.

In the interest of clarity, several example alternative methods are described in plain language. Such plain language descriptions of the various steps included in a particular method allow for easier comprehension and a more fluid description of a claimed method and its application. Accordingly, specific method steps are identified by the term "step" followed by a numeric reference to a flow diagram presented in the figures, e.g. (step 5). All such method "steps" are intended to be included in an open-ended enumeration of steps included in a particular claimed method. For example, the phrase "according to this example method, the item is processed using A" is to be given the meaning of "the present method includes step A, which is used to process the item". All variations of such natural language descriptions of method steps are to be afforded this same open-ended enumeration of a step included in a particular claimed method.

FIG. 1 is a flow diagram that depicts one example method for assigning processing work in a parallel computing system. As such, this example method comprises assigning a solution strategy to a particular processing core (step 10) in a plurality of processing cores, receiving a work unit in a parallel computing system (step 15); directing the work unit to particular processing cores in the plurality of processing cores (step 20); performing the work specified in the work unit in the various processors included in the plurality of processing cores (step 25); allowing processing cores in the plurality of processing cores to maintain a private state indicator (step 30); migrating to a global memory the private state variable (step 40) of a processing core that was first to finish processing (step 35) a work unit; delivering to an end-user a solution unit (step 42) that results from processing of the work unit when the processing core is the first to finish processing the work unit; and preventing other processing cores from migrating their own private state indicators to a global memory (step 45).

In this example method, various processing cores in a plurality of processing cores are assigned different solution strategies (step 10) in order to process an incoming work unit. In this example method, a work unit is received in a parallel computing system (step 15). Such a parallel computing system, according to one illustrative use case, comprises a network processing device. For example, a network processing device may include a router or an intelligent switch. These example illustrative use cases are not intended to limit the scope of the claims appended hereto.

Once the work unit arrives in the parallel computing system, it is directed to particular processing cores in the plurality of processing cores (step 20) included in such parallel computing system. Then, the particular processing cores are allowed to perform work in accordance with their assigned solution strategies (step 25). As the particular processing cores perform work, they maintain private state indicators (step 30).

Software-based TLS systems typically not only require each processing core to maintain an individual state indicator in a global memory but these systems also require that each processing core maintain a state indicator in a different region of the global memory. This example method provides for storing and maintaining the private state indicator in a memory local to a processing core, which is typically accessible only by a processor included in each processing core as herein described.

According to this example method, particular processing cores are monitored as they continue to perform work so as to identify a processing core that completes its assigned work before any other processing core. When one such processing core finishes its assigned work (step 35), that processing core is allowed to migrate its private state indicator to a global memory (step 40). That processing core is also allowed to deliver its resulting solution unit to an end-user (step 42). Other processing cores, included in the plurality of processing cores, are prevented from migrating their private state indicators to the global memory (step 45). This, according to various example methods, is accomplished by disabling a memory controller that the processing core would otherwise use to access a global memory.

It should be appreciated that, according to one alternative example of the present method, the private state indicator for any particular processing core is mapped to the same region of a common address space. As a result, when a particular processing core migrates its private state indicator to the global memory, the private state indicator is stored in the same region of the common address space irrespective of which particular processing core migrates its private state indicator to the global memory. This means that there is need for only one version of any particular software that embodies a particular solution strategy. This also means that, as a particular processing core is configured with a particular solution strategy, there is no need to keep track of which region of the global memory is being used by any particular processing core to store its private state indicator. All processing cores are then able to rely on a common mapping of state indication at a system level.

Figure 2:
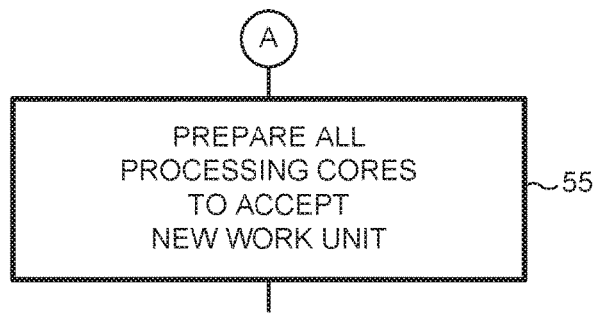
FIG. 2 is a flow diagram that depicts an alternative method that contemplates preparation of processing cores in a parallel computing system.

FIG. 2 is a flow diagram that depicts an alternative method that contemplates preparation of processing cores in a parallel computing system. It should be appreciated that, once a particular work unit has been processed according to the method described herein, the processing cores need to be prepared to accept a new work unit (step 55). In a simplistic alternative of the present method, preparing the processing cores included in a plurality of processing cores is accomplished by asserting a reset signal, thereby causing the processing cores to revert to an initial state.

Figure 3:
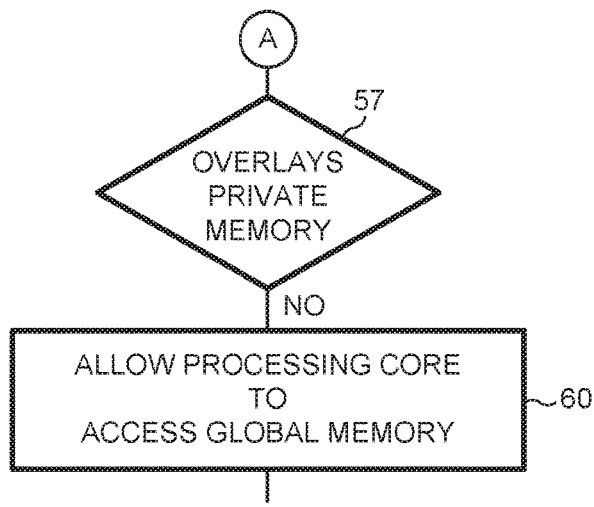
FIG. 3 is a flow diagram that depicts one alternative method for granting a processing core access to a global memory.

FIG. 3 is a flow diagram that depicts one alternative method for granting a processing core access to a global memory. According to this alternative example method, a processing core typically interacts with a private memory included therein. When the processing core interacts with the local memory, such interaction does not propagate to a global memory. However, when the processing core specifically addresses a region in memory that does not correspond to its private memory (step 57), such access results in an access to the global memory (step 60).

Figure 4:
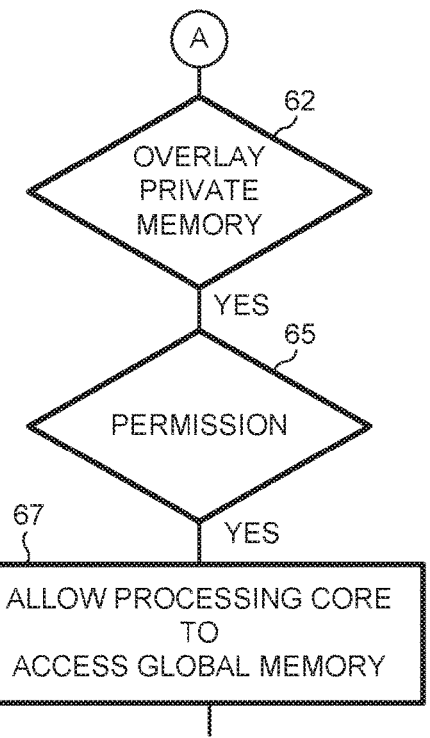
FIG. 4 is a flow diagram that depicts another alternative method for granting a processing core access to a global memory where such access corresponds to a region in a private memory included in the processing core.

FIG. 4 is a flow diagram that depicts another alternative method for granting a processing core access to a global memory where such access corresponds to a region in a private memory included in the processing core. It should be appreciated that, according to this alternative example method, when a processing core has finished its work and it is recognized as the first processing core to finish its work, then that processing core receives permission to access a global memory that overlays a private memory included in the processing core. This, in one alternative method, is accomplished by directing a "permission" signal to a memory access controller. In one alternative method, this is accomplished by enabling a transactional memory channel controller when such permission is received by the processing core.

Accordingly, should a memory request generated by the processing core correspond to its private memory (step 62), then the memory request propagates through to a global memory (step 67) when that processing core receives a permission indicator (step 65). According to one illustrative use case, such a permission indicator is generated by a hardware monitoring system included in a parallel processing system that implements the teachings and techniques herein described.

Figure 5:
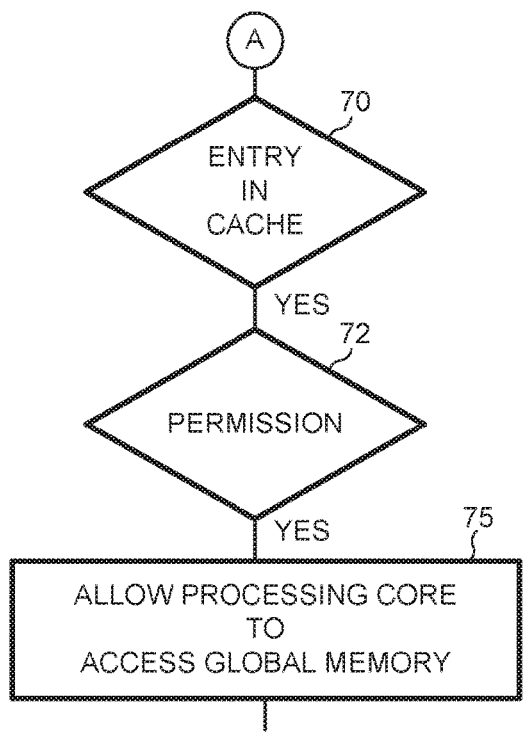
FIG. 5 is a flow diagram that depicts one alternative example method wherein "write-through" of a cache memory included in a processing core is qualified according to the state of work exhibited by said processing core.

FIG. 5 is a flow diagram that depicts one alternative example method wherein "write-through" of a cache memory included in a processing core is qualified according to the state of work exhibited by said processing core. According to this alternative example method, the processing core includes a cache memory that implements a "write-through" function, which is well understood throughout the industry. When the processing core attempts to modify a location included in the cache memory, such modification will also propagate to a global memory when the processing core has been granted permission to access the global memory.

It should be appreciated that, according to this alternative example method, the processing core executes a series of instructions that are included in its local cache memory. The local cache, according to various alternative methods, is also used to store data. For example, private data that is used to support processing according to a particular solution strategy, depending on the circumstances, is stored in the local cache. All of these accesses to the local cache are not allowed to propagate to the global memory unless the processing core has received permission for such access. It should be appreciated that a processing core receives permission to access global memory for these particular types of write directives only when it is the first processing core to complete work according to an assigned solution strategy.

It should then be appreciated that, according to this example method, when a particular write directive corresponds to a memory location that is stored as an entry in that processing core's local cache (step 70), the write directive is propagated through to the global memory (step 75) when that processing core has been granted permission (step 72) to do so. Such permission, according to this example method, is received by way of a global memory permission indicator.

It should likewise be appreciated that such a global memory permission indicator, according to various illustrative use cases of the present method, is generated by a hardware element included in the parallel processing system which monitors various processing cores in order to identify a processing core that has completed its work before any of the other processing cores. The "first to complete" processing core is then granted permission to modify global memory, which then permits that processing core to migrate its private state indicator to the global memory. It should also be appreciated that when such permission is granted to the processing core, various alternative methods also include a step wherein a solution unit is also migrated to global memory.

Figure 6:
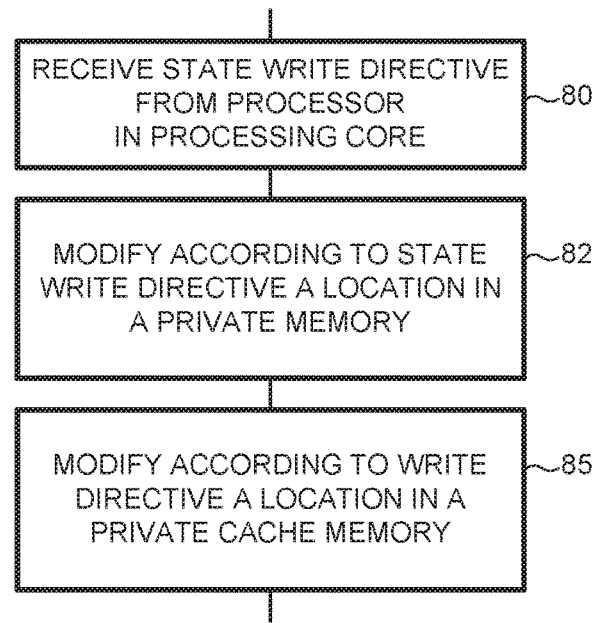
FIG. 6 is a flow diagram that depicts another alternative method for storing a private state indicator in a private memory.

FIG. 6 is a flow diagram that depicts another alternative method for storing a private state indicator in a private memory. According to this alternative example method, a private state indicator is stored in a memory that is private to a particular processing core. In this alternative method, a write directive is received from a processor included in a particular processing core (step 80). It should be appreciated that, according to various illustrative use cases, a processing core includes a processor that interacts with private components using a communication bus. Accordingly, such a state write directive is received by a local memory that is communicatively coupled to the processor by means of the communication bus.

Once the private memory receives the state write directive from the processor, a particular location in that private memory is modified according to the state write directive (step 82). According to yet another alternative example method, a write directive generated by the processor is used to modify a location in a private cache memory (step 85).

It should now be appreciated that, according to various alternative methods herein presented, a particular processing core included in a plurality of processing cores operates upon a particular work unit that various processing cores receive in a substantially contemporaneous manner. As such processing cores operate, they apply particular, but disparate solution strategies to the work unit that they receive. As these various processing cores operate in this manner, a particular processing core maintains a system state indicator in its own private memory. According to yet another alternative method, a step for storing and a step for retrieving temporal data in the private memory are also included. Hence, in one alternative example method, a processing core is able to apply an assigned solution strategy to the work unit without needing any external memory.

FIG. 7 is a flow diagram that depicts one alternative method for migrating a private state indicator to global memory. According to this alternative example method, a value from a memory that is private to a processing core is directed to a global memory (step 87). Once one of the processing cores has completed its processing, hardware enables that processing core to access a global memory. And, as has been demonstrated in the various alternative methods herein described, the processing core does nothing more than execute a final sequence of tasks in order to migrate its private state indicator to the global memory. Access to the global memory is precluded in those processing cores that have not been granted the requisite permission to access global memory.

FIG. 8 is a flow diagram that depicts yet another alternative method for migrating a private state variable to a global memory. In this alternative example method, an address is presented to a global memory (step 90). In one alternative example method, this occurs by presenting an address to a memory channel controller, which is included in a processing core. In the event that the address is within a particular range (step 92), then the global memory will accept the private state variable (step 100) if the processing core seeking to store a private state variable is the first processing core to complete its assigned work (step 95). For example, when a processing core is the first to finish processing a work unit according to an assigned solution strategy.

Figure 9:
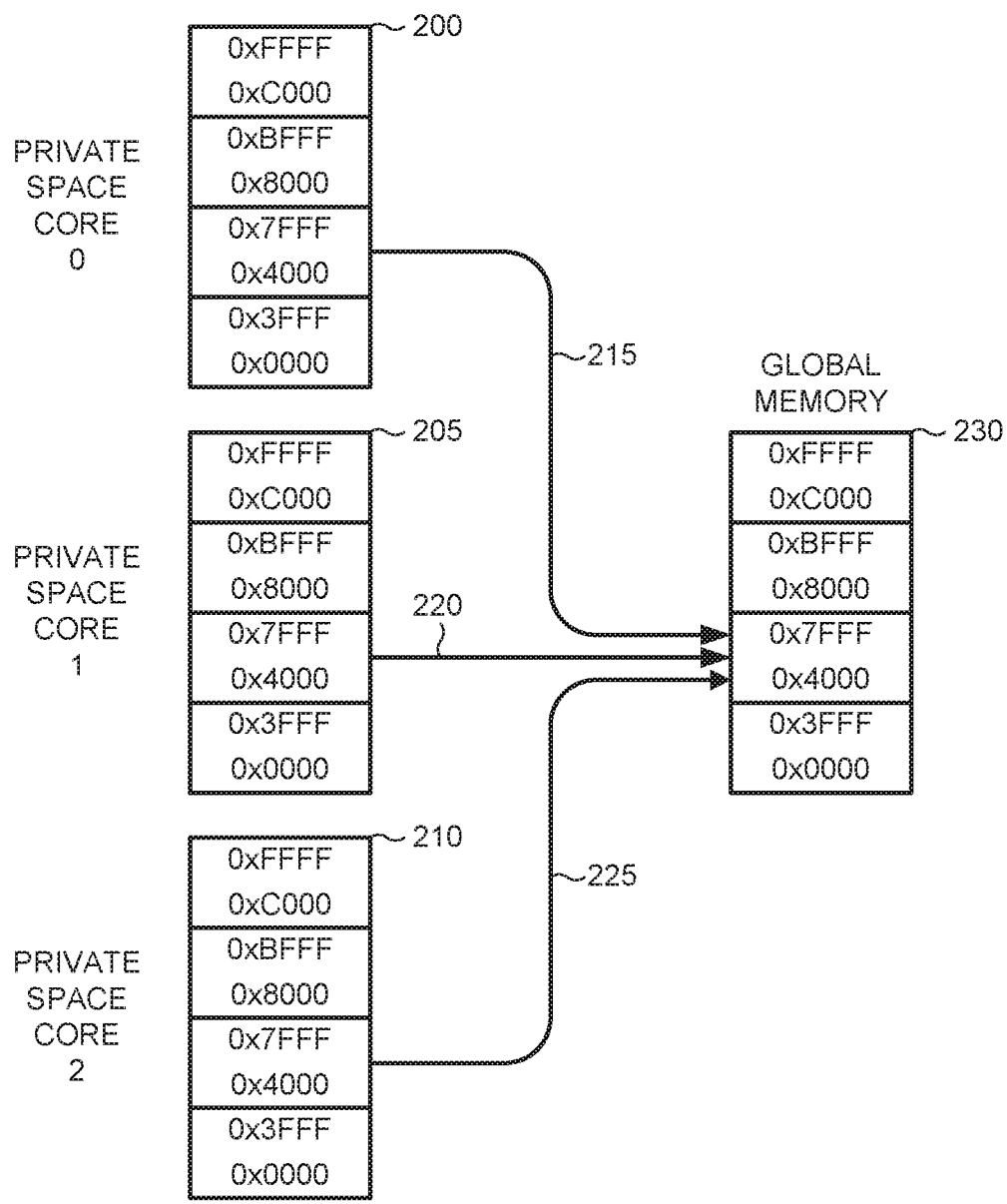
FIG. 9 is a pictorial illustration that depicts the manner in which a private memory address space in a processing core overlays upon a global memory address space.

FIG. 9 is a pictorial illustration that depicts the manner in which a private memory address space for any particular processing core overlays upon a global memory address space. As can be appreciated, any processing core is able to operate upon the same memory space as any other processing core in a plurality of processing cores included in a parallel processing system. When a processing core does not receive an active hardware permission indicator, any access to private memory remains localized.

As an example that is not intended to limit the scope of the claims appended hereto, consider any private address space 200, 205, 210 and also consider that various such private address spaces are partitioned into four regions. Partitioning into four regions is merely for the sake of illustration and is not intended to limit the claims appended hereto. The lowest region, for example, occupies 0x0000 through 0x3FFF, which are addresses expressed in hexadecimal form. Perhaps, according to this non-limiting example, instructions to be executed by a processor included in a processing core are stored in this lower region. Given that a particular processing core in a plurality of processing cores is assigned a different solution strategy, the instructions stored in this lower region of each processing core's private address space 200, 205, 210 will be different from one processing core to the next.

Continuing with this non-limiting example, the private memory space for each processing core starting at 0x8000 and continuing through the top of the memory space (0xFFFF) may not correspond to any physical memory included in any of the processing cores. Accordingly, when any processing core interacts with a memory location in this upper memory space, write directives and read directives are propagated directly to the global memory address space 230. It should be appreciated that as different processing cores all attempt to interact with memory in this upper region, such interactions are subject to memory conflict errors because one processing core may overwrite information stored at the same memory location by a different processing core.

Hence, a processing core, as it performs according to an assigned solution strategy, interacts with local memory which is overlaid upon the global memory's address space. Perhaps, according to this same non-limiting example, the private address space of any particular processing core that resides from 0x4000 through 0x7FFF is used for storage of a private state indicator. Also, this particular region of the processing core's private memory space may also be used to store temporal data and a solution unit. Such private memory, according to various alternative embodiments, may be used to store an incoming work unit.

When the hardware permission indicator is not active, any access to the private memory in the region spanning from 0x4000 through 0x7FFF is not allowed to propagate to the global memory. This data space is, in the absence of an active hardware permission indicator, private to a particular processing core. When the hardware permission indicator is active, any write directive from a processing core not only writes a value to the private memory in the processing core, but is also propagated 215, 220, 225 to a global memory 230. All of this supports thread level speculative processing in a manner where each processing core is substantially oblivious to the fact that it is only one of many processing cores operating to yield a solution unit according to the work unit received.

Figure 10:
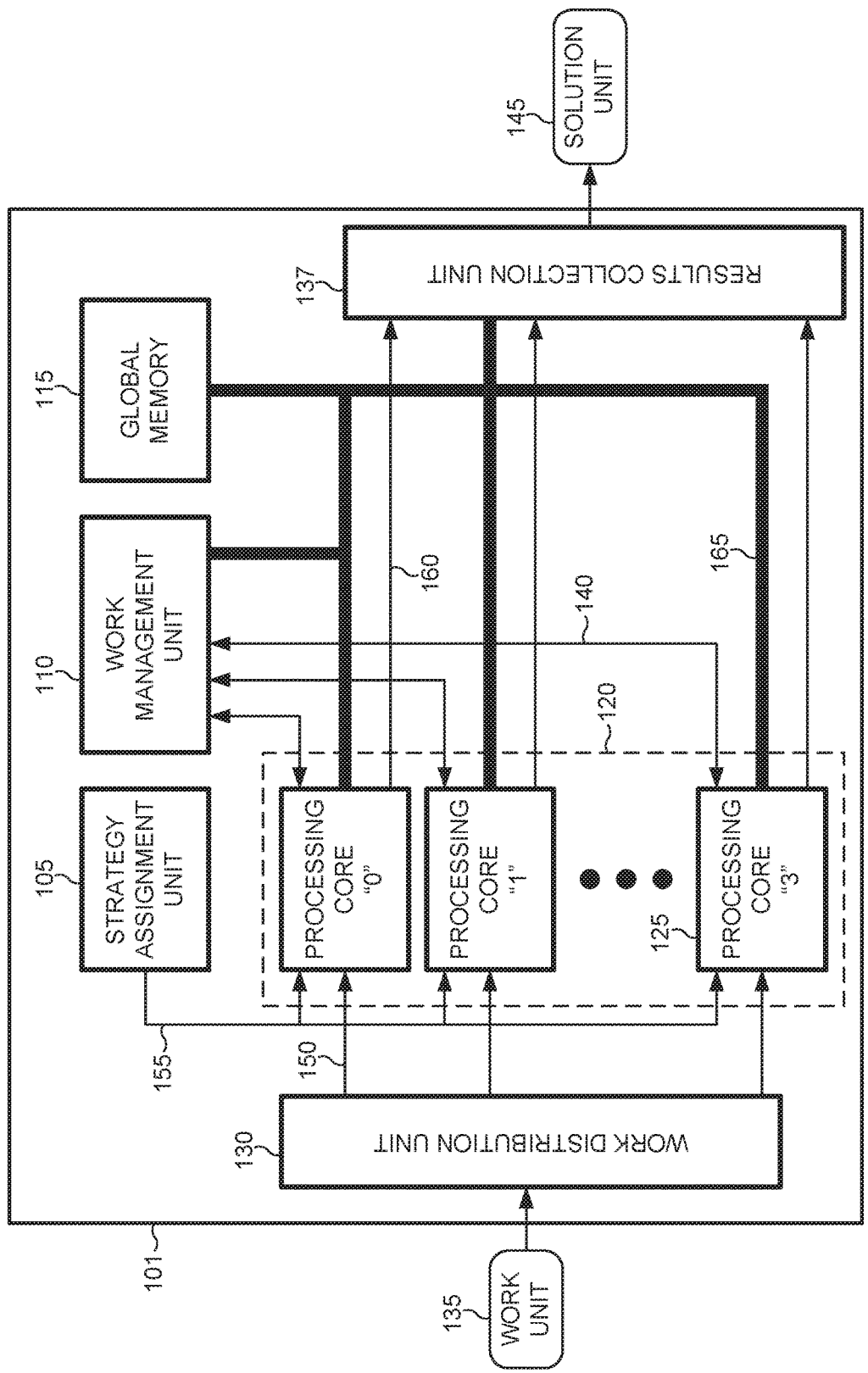
FIG. 10 is a block diagram that depicts one example embodiment of a parallel processing system.
Figure 11:
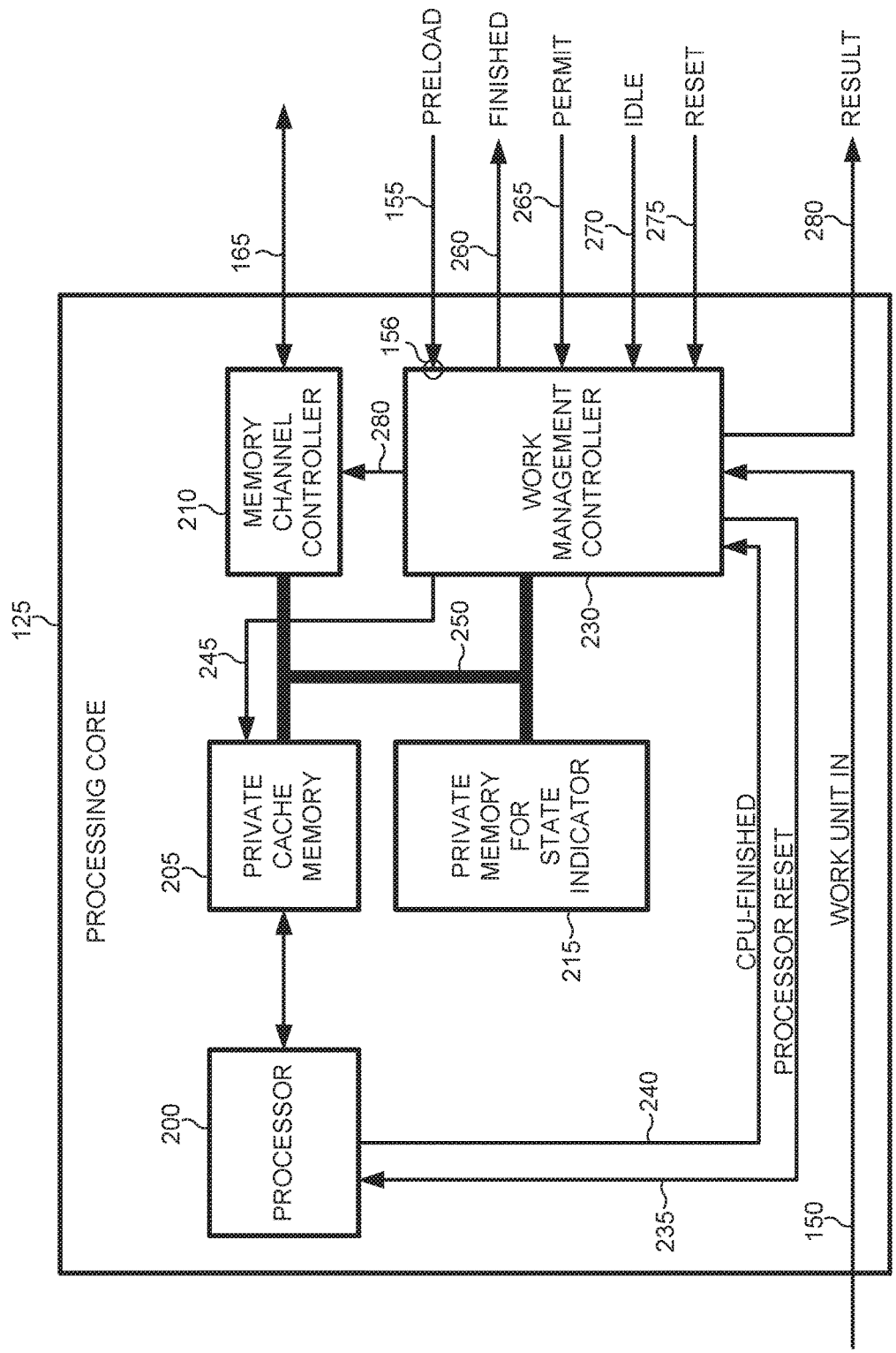
FIG. 11 is a block diagram that depicts one example embodiment of a processing core.

FIG. 10 is a block diagram that depicts one example embodiment of a parallel processing system. FIG. 11 is a block diagram that depicts one example embodiment of a processing core. According to this example embodiment, a parallel processing system 101 comprises a plurality of processing cores 120, a strategy assignment unit 105, a work distribution unit 130, a work management unit 110, and a results collection unit 137. It should be appreciated that, according to this example embodiment, the strategy assignment unit 105 assigns a particular processing core 125 to a particular solution strategy.

It should be appreciated that, according to one alternative example embodiment, assigning a particular solution strategy to a particular processing core 125 is accomplished by directing a software program, or instruction sequence, to that particular processing core 125. It should likewise be appreciated that, in this alternative embodiment, a particular software program is embodied in an instruction sequence that, when executed by a processor included in any processing core 125, causes that processing core 125 to apply its assigned solution strategy to a particular work unit 135.

In one alternative example embodiment, the strategy assignment unit 105 communicates with any particular processing core 125 using a data communication bus 155. It should be appreciated that any appropriate communication bus may be utilized for such purpose. For example, alternative embodiments include at least one of a universal serial bus (USB Bus), a parallel data bus, and an Ethernet communication link. It should be appreciated that these examples of different types of data communication buses are intended merely to illustrate the flexibility of the present embodiment. Accordingly, any particular communication bus 155 described herein and that is used to communicate a solution strategy from the strategy assignment unit 105 to any of the processing cores 125 is not intended to limit the scope of the claims appended hereto.

It should likewise be appreciated that, according to various alternative embodiments, the data communications bus 155 comprises a point-to-point data connection wherein the strategy assignment unit 105 is the center of a multi-point star. Hence, the strategy assignment unit 105 is connected by individual point-to-point data connections to the various processing cores 125 included in this alternative example embodiment.

FIG. 10 further illustrates that, as this example embodiment operates, the work distribution unit 130 receives a work unit 135. The work distribution unit 130 then communicates 150 the work unit to particular processing cores 125 included in the plurality of processing cores 120. It should likewise be appreciated that the work distribution unit 130 communicates 150 the work unit to various processing cores 125 in a substantially contemporaneous manner. Such communication is, according to various alternative embodiments, is accomplish by way of at least one of a point-to-point interface and a data bus interface. The purpose of this, according to one alternative embodiment, is to ensure that the various processing cores 125 begin processing a work unit 135 substantially at the same time. It should also be appreciated that the various processing cores 125 will begin processing a work unit 135 according to its particular assigned solution strategy.

FIG. 10 also illustrates that, according to one alternative example embodiment, a parallel processing system further comprises a global memory 115. In various alternative embodiments, the global memory 115 is used to store a work unit. In these alternative embodiments, the work unit is communicated to various processing cores 125 by way of an internal data bus 165. It should be appreciated that, according to these alternative embodiments, the work unit is communicated to various processing cores 125 by way of a small software program executing in each processing core 125. This small program, when executed by a processor included in a particular processing core, minimally causes the processing core to retrieve, by way of the data bus 165, the work unit from the global memory 115.

FIG. 10, when taken with FIG. 11, further illustrates that the work management unit 110 controls a particular processing core 125 by means of a control interface 140. It should be appreciated that the control interface 140, according to one alternative embodiment, comprises individual point-to-point connections wherein such connection is a digital signal. Using these individual digital signals, the work management unit 110 in this alternative embodiment of a parallel processing system 101, causes the various processing cores 125 to begin processing a work unit according to their individually assigned solution strategies.

Once various processing cores 125 receive the work unit 135 from at least one of the global memory 115 and the work distribution unit 130, these processing cores 125 await a command from the work management unit 110 in order to enable them to begin processing the work unit 135 according to their individually assigned solution strategies.

As is discussed later in this disclosure, one alternative embodiment provides that the work management unit 110 directs an "IDLE" signal 270 to the various processing cores 125. In this alternative embodiment, the IDLE signal 270 causes the various processing cores 125 to remain in an idle state until the IDLE signal 270 is de-asserted. As can be appreciated from the foregoing, the work management unit 110 enables particular processing cores 125 to begin work on a work unit 135 in a substantially contemporaneous manner by de-asserting the IDLE signal 270 to the various processing cores 125 included in the plurality of processing cores 120 in this same substantially contemporaneous manner.

The various processing cores 125 communicate feedback information back to the work management unit 110 by means of this same control interface 140. For example, a particular processing core 125 in this alternative example embodiment generates a "FINISHED" signal 260. When any particular processing core 125 successfully completes its processing task, it asserts its FINISHED signal 260 in order to indicate to the work management unit 110 that it has completed processing of a work unit 135 according to its assigned solution strategy.

When any particular processing core 125 indicates that it has finished its processing, the work management unit 110 then uses the control interface 140 in order to allow that particular processing core 125 to access a global memory 115. As can be appreciated through the study of the methods and techniques herein described, a processing core 125 that is the first to complete its processing task is then allowed to migrate its private system state indicator to the global memory 115.

In some alternative example embodiments, a processing core 125 that completes its processing task before any other is allowed to send its solution unit to the results collection unit 137. Accordingly, the results collection unit 137 receives a solution unit from the processing core 125 that was the first to complete its processing task and then directs the solution unit 145 to an end-user. According to various alternative example embodiments, the results collection unit 137 receives a solution unit 145 by way of a plurality of dedicated, point-to-point interfaces 160 that connect the various processing cores 125 to the results collection unit 137. It should likewise be appreciated that, according to other illustrative embodiments, the solution unit is communicated to the results collection unit 137 by way of the system data bus 165. It should likewise be appreciated that the results collection unit 137 is a simple multiplexer, the structure of which is readily apparent by studying the drawings.

It should be appreciated that, according to various alternative example embodiments, the end-user may actually be an interface, for example an Internet interface, so that the solution unit 145 is communicated by way of the Internet to a remote end-user. It should likewise be appreciated that the solution unit 145, according to alternative example embodiments, is communicated to an end-user that comprises another processing task that is performed either within the parallel processing system or in another computing system.

After a particular processing core has notified, by way of the its FINISHED signal 260, that it has finished its work, the work management unit 110, according to one alternative example embodiment, asserts the IDLE signal 270 to other processing cores 125 in order to suspend their work activities. In yet another example embodiment, the work management unit 110 will assert the RESET signal 275 after it perceives that a global state variable has been updated in order to prepare all processing cores 125 to initialize and make themselves ready to process a subsequent work unit 135.

Referring to FIG. 11, one example embodiment of a processing core includes a processor 200, a private memory 215, a work management controller 230, and a memory channel controller 210. According to one alternative embodiment, a processing core further comprises a private cache memory 205. Depending on the particular instruction sequence received by a processing core 125, a private state variable is maintained in at least one of the private memory 215 and the private cache memory 205.

It should be appreciated that the work management controller 230 supports thread level speculative processing by controlling, through a hardware mechanism, the manner in which the processing core 125 is able to interact with an external memory. It is important to note that, as the parallel processing system 101 herein described begins to operate, the strategy assignment unit 105 will cause a particular processing core 125 to be configured with a particular solution strategy. As already discussed, a communication bus 155 is used to communicate such configuration from the strategy assignment unit 105 to each particular processing core 125.

In one alternative example embodiment, the work management controller 230 includes a preload input 156, which is coupled to the communication bus 155. It should be appreciated that the preload input 156 receives configuration information from the strategy assignment unit 105 by way of the communication bus 155. As already described, the form and structure of this communications channel 155, according to various alternative embodiments, comprises at least one of a serial communications link and a parallel communications link. And, any examples of specific embodiments of the configuration communications channel 155 cited here are not intended to limit the scope of the claims appended hereto.

In this alternative example embodiment, the preload input 156 is used to receive an instruction sequence. It should be appreciated that the instruction sequence, according to this alternative example embodiment, comprises instructions that embody a particular solution strategy. Hence, when the processor 200 executes these instructions, the processor 200 operates upon a work unit according to a solution strategy as embodied in the instruction sequence that the particular processor 200 received.

In one alternative example embodiment, the work management controller 230 receives an instruction sequence and then directs 245 the instruction sequence to a private cache memory 205. Accordingly, once the instruction sequence is received, the processing core 125 is ready to apply its solution strategy to an incoming work unit 135. In yet another alternative embodiment, the work management controller 230 receives an instruction sequence from the strategy assignment unit 105 and then directs the instruction sequence to the private memory 215 using the internal data bus 250. In some embodiments, the private memory 215 is large enough to store an instruction sequence so that the processing core 125 does not need to fetch instructions from an external memory (e.g. a global memory 115) by way of the memory channel controller 210.

In yet another alternative example embodiment, the work management controller 230 also receives a CPU-FINISHED signal 240 from the processor 200 when the processor 200 has completed processing a particular work unit. The work management controller 230 then generates a FINISHED signal 260, which is directed to the work management unit 110. In the event that a particular processing core 125 is the first processing core to assert is FINISHED signal 260 to the work management unit 110, then the work management unit 110 will direct a PERMIT signal 265 to the processing core 125. The PERMIT signal 265 indicates to the processing core 125 that it was the first processing core to finish processing a work unit.

It is also important to note that the criteria under which a processing core determines that it has finished its work is included in the work unit and varies based upon the type of work that is to be conducted. It is also important to note that this function is imparted upon the various processing cores by way of additional instructions that are included in instruction sequences directed to the various processing cores by the strategy assignment unit 105.

In one alternative example embodiment, the PERMIT signal 265 is processed by the work management controller 230 included in a particular processing core 125. When the PERMIT signal 265 is active, the work management controller 230 will enable the memory channel controller 210 using an enable signal 280. When the memory channel controller 210 is enabled in this manner, it will allow write directives generated by the processor 200 to access a global memory.

It should be appreciated that the memory channel controller 210, according to one alternative example embodiment, is configured so that any memory access requested by the processor 200 that is within a particular region of a memory map is always honored. Such unfettered access is typically reserved for access to a global memory where such access is nonexclusive. Accordingly, such nonexclusive access to a global memory is susceptible to memory conflict errors because other processing cores 125 in the system also have such nonexclusive access to a global memory. Hence, it is important to realize that a processing core 125 that stores information at a particular location in this particular region of a memory map should not rely upon that information because a different processing core 125 may also use that same location to store information in this region of the memory map.

It should likewise be appreciated that the memory channel controller 210 of this particular alternative example embodiment is also configured so that any memory access requested by the processor 200 within a different region of a memory map is only honored if the PERMIT signal 265 is active. Accordingly, when the work management controller 230 perceives that the PERMIT signal 265 is active, the work management controller 230 enables the memory channel controller 210 using the enable signal 280.

Such a different region of a memory map is typically associated with a private memory 215 included in the processing core 125. Accordingly, a write directive generated by the processor 200 will modify a location in the private memory 215 and, if the PERMIT signal 265 is asserted, in a global memory by way of the memory channel controller 210. It should be appreciated that, in some respects, this operation is much akin to a "write through" cache structure. Such a write directive, according to these alternative example embodiments, includes a write to modify at least one of a private state indicator and a temporal variable.

It should likewise be appreciated that, when the PERMIT signal 265 is active, the processing core is able to migrate its private state indicator to a global memory by merely writing a value to its local private memory 215. Hardware will then also propagate such a write directive to a global memory 115. This results in a new written value, for example for a private state indicator, to be stored in the local private memory 215 and in the global memory 115. When an entry in a private cache memory 205 corresponds to a location in the private memory 215 that is used to store the private state indicator, a write directive, when the PERMIT signal 265 is active, results in modification of the cache entry in the private cache memory 205, the private memory 215 and a global memory 115. Such a write directive, according to these alternative example embodiments, includes a write to modify at least one of a private state indicator and a temporal variable.

It should likewise be appreciated that when the PERMIT signal 265 is not active, the enable signal 280 also remains inactive. In this situation, any write directive generated by the processor 200, for example a write directive generated by the processor 200 in a particular region of its memory map that is associated with a private memory 215, only modifies a location in the private memory and not in the global memory 115. An entry in a private cache memory 205 is also modified under some circumstances where there is a cache memory that corresponds to the private memory location accessed in this manner.

According to one alternative example embodiment, the work management controller 230 further includes an input to receive an IDLE signal 270. In these alternative example embodiments, the work management unit 110 will assert the IDLE signal 270 to all processing cores 125 except for the processing core 125 that was the first to complete its processing of an incoming work unit.

According to yet another alternative example embodiment, the work management controller further receives a RESET signal 275. In these alternative example embodiments, the work management unit 110 will assert the RESET signal 275 in order to cause all processing cores to reinitialize. In these alternative example embodiments, the work management unit 110 will assert the RESET signal 275 after a processing core 125 has updated a global state indicator in a global memory 115 and has provided a solution unit to at least one of the results collection unit 137 and a global memory 115. In this alternative example embodiment, the work management controller 230, when it receives an active RESET signal 275, directs a processor reset signal 235 to the processor 200 included in the processing core 125.

According to yet another alternative example embodiment, the work management controller further includes an input 150 for receiving a work unit. In some alternative example embodiments, the work management controller 230 receives a work unit 135 by way of the work unit input 150 and directs the work unit into the private memory 215 by way of the internal data bus 250, which is included in the processing core 125.

According to yet another alternative example embodiment, the work management controller 230 further includes a results output 280. Once the processor asserts its finished signal 240 to the work management controller 230, the work management controller 230 retrieves a solution unit 145 from the private memory 215 and directs the solution unit 145 to the results output 280.

Figure 12:
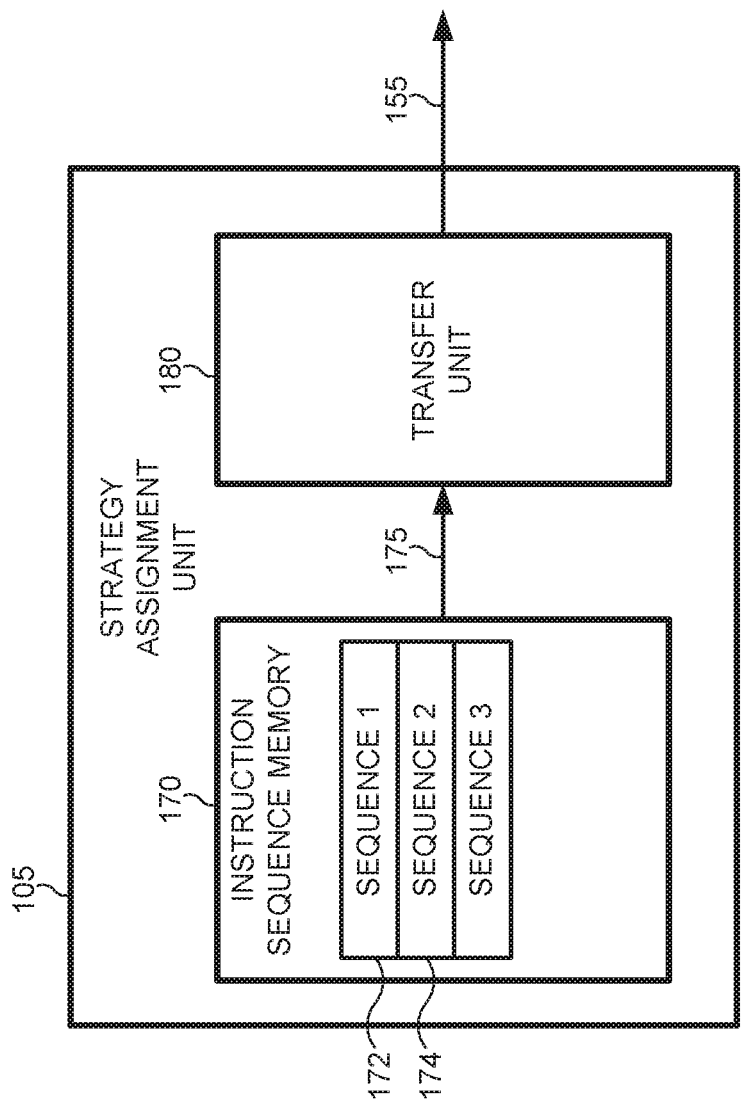
FIG. 12 is a block diagram that depicts one example embodiment of a strategy assignment unit.

FIG. 12 is a block diagram that depicts one example embodiment of a strategy assignment unit. According to this example embodiment, a strategy assignment unit 105 includes an instruction sequence memory 170 and a transfer unit 180. It should be appreciated that, when a parallel processing system 101 begins to operate, the strategy assignment unit 105 retrieves an instruction sequence from the instruction sequence memory 170 and delivers 175 that instruction sequence to the transfer unit 180. The transfer unit 180 then communicates the instruction sequence to a particular processing core 125 included in the plurality of processing cores 120. This action is repeated for various particular processing cores 125 included in the plurality of processing cores 120 so as to configure each processing core 125 to operate upon a work unit 135 using a different solution strategy.

In some embodiments, the instruction sequence memory 170 is used to store a plurality of instruction sequences (172, 174) wherein each instruction sequence causes a processing core 12, when that processing core executes the particular instruction sequence, to apply a particular solution strategy to a work unit 135. It should also be appreciated that the solution strategies are, in some embodiments, different from other solution strategies stored in the instruction sequence memory 170, as represented by the various instruction sequences (172, 174) stored in the instruction sequence memory 170.

While the present method and apparatus has been described in terms of several alternative and exemplary embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

What is claimed is:

1. A method for assigning processing work in parallel computing comprising:
    assigning a particular solution strategy to a particular processing core included in a plurality of processing cores;
    receiving a work unit in a parallel computing system;
    directing the work unit to various processing cores included in plurality of processing cores;
    performing the work specified in the work unit in various processing cores included in the plurality of processing cores;
    allowing a particular processing core in the plurality of processing cores to maintain a private state indicator;
    migrating to a global memory the private state variable of a processing core that was first to finish processing a work unit;
    delivering to an end-user a solution unit that results from processing of the work unit when the processing core is the first to finish processing the work unit; and
    preventing any other processing core from migrating its private state indicator to global memory.

2. The method of claim 1 wherein receiving a work unit comprises receiving an input dataset and a criteria for indicating when work upon the dataset finished.

3. The method of claim 1 further comprising preparing all processing cores in the plurality of processing cores to accept a new work unit assignment.

4. The method of claim 1 further comprising allowing a processing core included in the plurality of processing cores to modify a location in global memory when the location addressed by the processing core does not correspond to a private memory included in the processing core.

5. The method of claim 1 further comprising allowing a processing core included in the plurality of processing cores to modify a location in global memory when the location addressed by the processing core corresponds to a private memory included in the processing core and the processing core receives a global memory permission indicator.

6. The method of claim 1 further comprising allowing a processing core included in the plurality of processing cores to modify a location in global memory when the location addressed by the processing core corresponds to an entry in a private cache memory included in the processing core and the processing core receives a global memory permission indicator.

7. The method of claim 1 wherein allowing a particular processing core to maintain a private state indicators comprises:
    receiving a state write directive from a processor included in the processing core; and
    modifying according to the write directive a location in a memory that is private to the processing core.

8. The method of claim 7 wherein allowing a particular processing core to maintain a private state indicator comprises further comprising:
    modifying a location in a cache memory that is private to the processing core according to the write directive.

9. The method of claim 1 wherein migrating the private state indicator to global memory comprises:
   directing to the global memory a value from a memory that is private to the processing core.

10. The method of claim 1 wherein migrating the private state indicator to global memory comprises:
    presenting an address to the global memory; and
    allowing a value to be received by the global memory when the address is within a pre-established range and when the processing core is the first to finish its work.

\* \* \* \* \*